United States Patent
Chang

(10) Patent No.: US 6,734,995 B2
(45) Date of Patent: May 11, 2004

(54) LIGHT LID WITH A PREVIEWING WINDOW

(75) Inventor: Chih-hsien Chang, Hsinchu (TW)

(73) Assignee: Microtek International, Inc., Hsinchu (TW)

( * ) Notice: Subject to any disclaimer, the term of this patent is extended or adjusted under 35 U.S.C. 154(b) by 538 days.

(21) Appl. No.: 09/735,510

(22) Filed: Dec. 14, 2000

(65) Prior Publication Data

US 2002/0126324 A1 Sep. 12, 2002

(30) Foreign Application Priority Data

Jun. 8, 2000 (TW) ........................................ 89209836 U

(51) Int. Cl.[7] .................................................. H04N 1/04
(52) U.S. Cl. ...................... 358/474; 358/506; 358/487; 399/378; 399/380
(58) Field of Search ................................ 358/474, 505, 358/509, 497, 473, 487, 506, 494, 975, 484; 399/378, 380

(56) References Cited

U.S. PATENT DOCUMENTS

| | | | | |
|---|---|---|---|---|
| 5,159,486 A | * | 10/1992 | Webb | 359/299 |
| 5,592,258 A | * | 1/1997 | Hashizume et al. | 355/41 |
| 5,956,103 A | * | 9/1999 | Ishiguro | 349/38 |
| 6,151,426 A | * | 11/2000 | Lee et al. | 382/205 |
| 6,271,939 B1 | * | 8/2001 | Hu et al. | 358/497 |

* cited by examiner

*Primary Examiner*—Kimberly Williams
*Assistant Examiner*—Negussie Worku
(74) *Attorney, Agent, or Firm*—Birch, Stewart, Kolasch & Birch, LLP

(57) ABSTRACT

A light lid with a previewing window is disclosed. The light lid provides a lightsome window to preview a transparent original. The light lid comprises a housing that has an opening, and a light conductive plate, which is positioned under the housing to conduct light upwards and downwards evenly so that the light illuminates evenly on the opening and a scanner. Therefore, a user can place a transparent original, such as negatives, above the opening to preview the image of the negatives clearly by the light which is conducted by the light conductive plate and past through the opening.

5 Claims, 3 Drawing Sheets ns window of the present invention.

LIGHT LID WITH A PREVIEWING WINDOW

BACKGROUND OF THE INVENTION

A. Field of the Invention

The present invention relates to a light lid, and more particularly, to a light lid with a previewing window.

B. Description of the Related Art

A common flat bed scanner scans opaque documents. Besides, when using with a light lid, it also can scan transparent originals such as negatives and films. As shown in FIG. 1, a typical light lid 100 comprises a housing 110, a light conductive plate 120, which is positioned under the housing 110, and light source devices 121, which are positioned on both sides of the light conductive plate 120. The light conductive plate 120 is used to conduct the light that comes from light source devices 121 upwards and downwards evenly in order to provide the light for the scanner.

However, the light provided by the above-mentioned light lid only illuminates into the scanner. It doesn't provide the light that illuminates toward the outside of the scanner; therefore, it cannot provide the function of previewing transparent originals. In other words, it cannot provide light outward to let user to preview the image of a negative or positive film before scanning the negative or the positive film.

SUMMARY OF THE INVENTION

In realizing the above-mentioned problem, an object of the present invention is to provide a light lid that uses a lightsome opening formed on the housing to achieve the function of previewing transparent originals.

To achieve the above-mentioned object, a light lid with a previewing window according to the present invention comprises a housing having a first opening, and a light conductive plate positioned under the housing. The light conductive plate conducts light upwards and downwards evenly to illuminate light evenly not only toward the scanner, but also toward the opening. Therefore, user can preview an transparent original by the light past through the opening.

Also, a light lid with a previewing window according to the present invention comprises light source devices, which are positioned on both ends of the light conductive plate, in order to provide the light for the light lid.

Furthermore, a light lid with a previewing window according to the present invention comprises second openings formed on both sides of the housing, and second reflecting plates located on both sides of the housing, corresponding to the location of the second openings. By using the openings and the reflecting plates, the external light can be reflected into the light conductive plate to provide the light for the light lid.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and advantages of the present invention will become apparent by reference to the following description and accompanying drawings, which are given by way of illustration only, and thus are not limitative of the present invention, and wherein.

DESCRIPTION OF THE PREFERRED EMBODIMENTS

Figure 1:
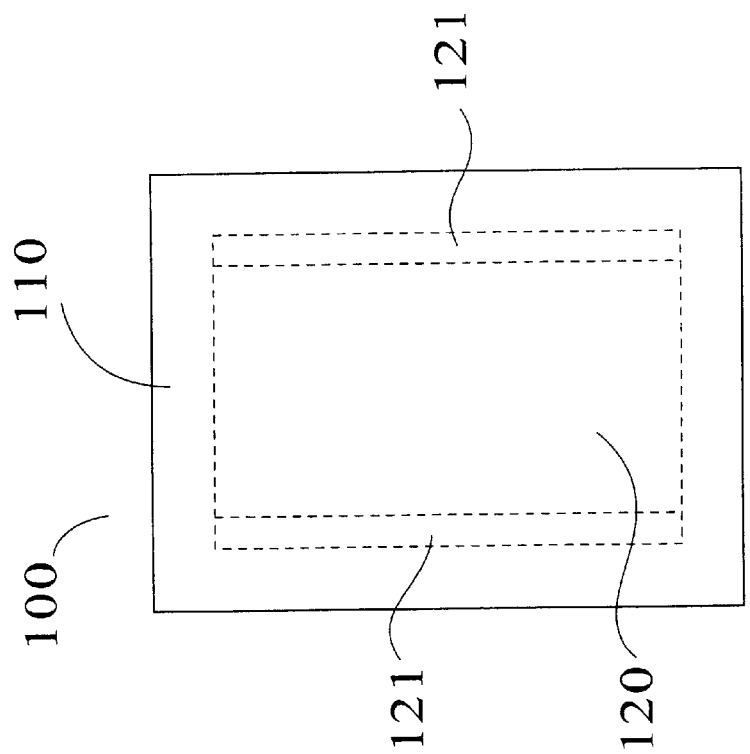
FIG. 1 is a top view of the light lid of the prior art.
Figure 2:
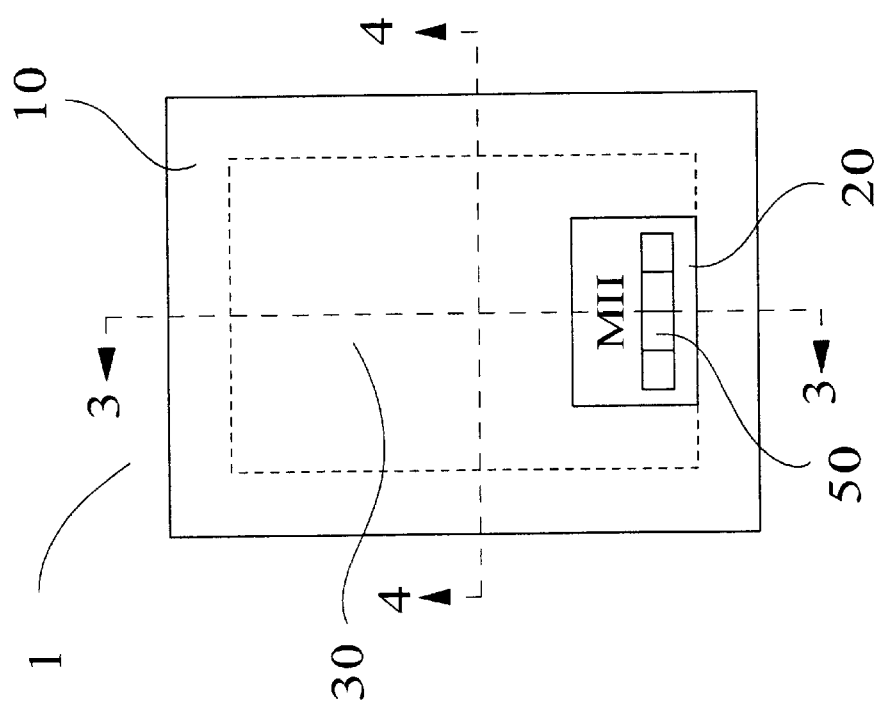
FIG. 2 shows a top view of the light lid with a previewing window of the present invention.

As illustrated in FIG. 2, the light lid 1 of the present invention comprises a housing 10 and a light conductive plate 30 which is fixed under the housing 10. The light lid 1 and the flat bed scanner (not shown in FIG. 2) are fixed together by hinges (not shown in FIG. 2), so that the light lid can be opened or closed. As illustrated in FIG. 2, a first opening 20 is formed on the housing 10 of the light lid 1. In this embodiment, although the opening 20 is formed on the front end of the housing 10, the opening 20 can also be formed on other places, such as on the back end of the housing. In addition, although the first opening 20 is a rectangle shape in this embodiment, it can also be formed in other shapes.

Figure 3:
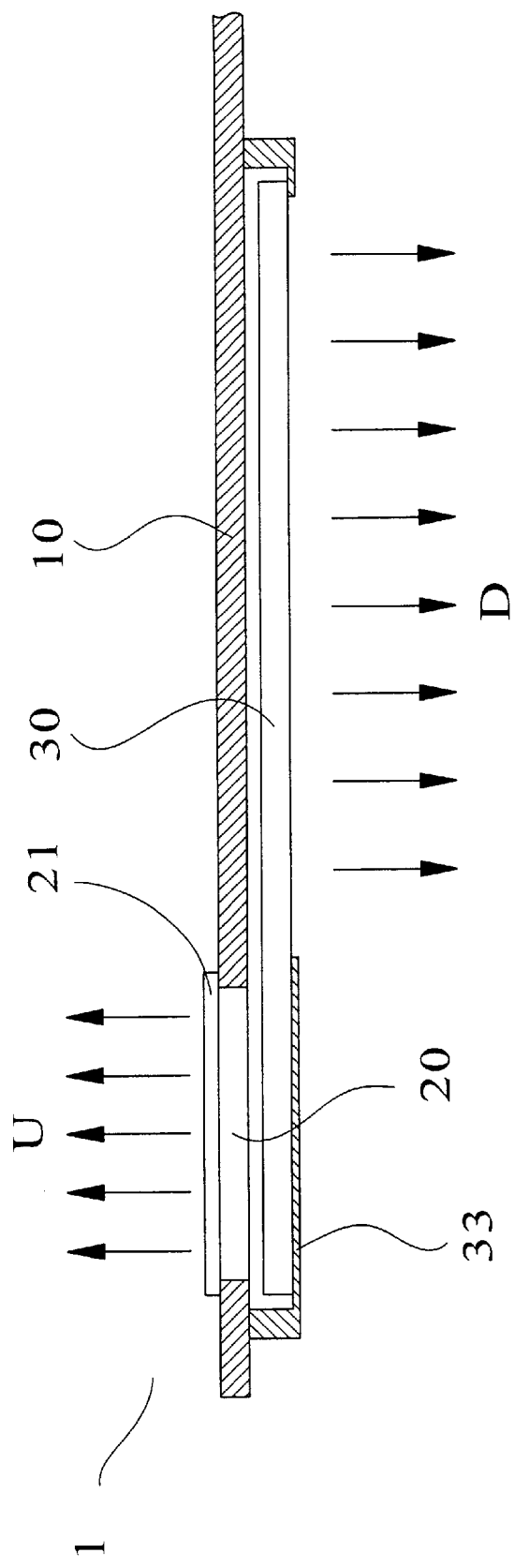
FIG. 3 is a sectional view cut along the 3-to-3 dashed line in FIG. 2.

As illustrated in FIG. 3, the light conductive plate is fixed under the housing 10, so the light can be conducted, illuminating evenly upwards (as shown by the arrows in the "U" direction) and downwards (as shown by the arrows in the "D" direction). Through the conduction, the light is provided to the first opening 20 for previewing and to the corresponding flat bed scanner for transparent original scanning. The method that the light conductive plate 30 is fixed to the housing 10 can be completed by the prior art, for example, by using glue or screw to fix the light conductive plate 30. That the light is provided to the light conductive plate 30 will be explained later.

In addition, the light lid 1 can also include a first reflecting plate 33, the reflecting plate 33 is located under the light conductive plate 30, which is corresponding to the location of the first opening 20. The reflecting plate 33 upwardly reflects the light (as shown by the arrows in the "U" direction) that comes from the light conductive plate 30. The light conductive plate 30 illuminates the light downwardly, so the light source that the user uses to preview the negatives or the films 50 can be intensified. If there is no need to intensify the light that reflects upwardly, of course the first reflecting plate 33 can be omitted. Therefore, as illustrated in FIG. 2, when the user wants to scan the negatives 50, the user first places the negatives 50 above the opening 20, and then uses the light that is reflected by the reflecting plate 33 to clearly preview the image of the negatives 50. Moreover, a company's logotype or trademark plate 21 (refer to FIG. 3), can also be placed above the opening 20 of the light lid 1. And then again the light that is reflected by the reflecting plate 33 can be used to emphasize the graphic design of the logotype plate 21. Meanwhile, the logotype plate 21 can prevent dust getting into the opening 20 as well.

Figure 4:
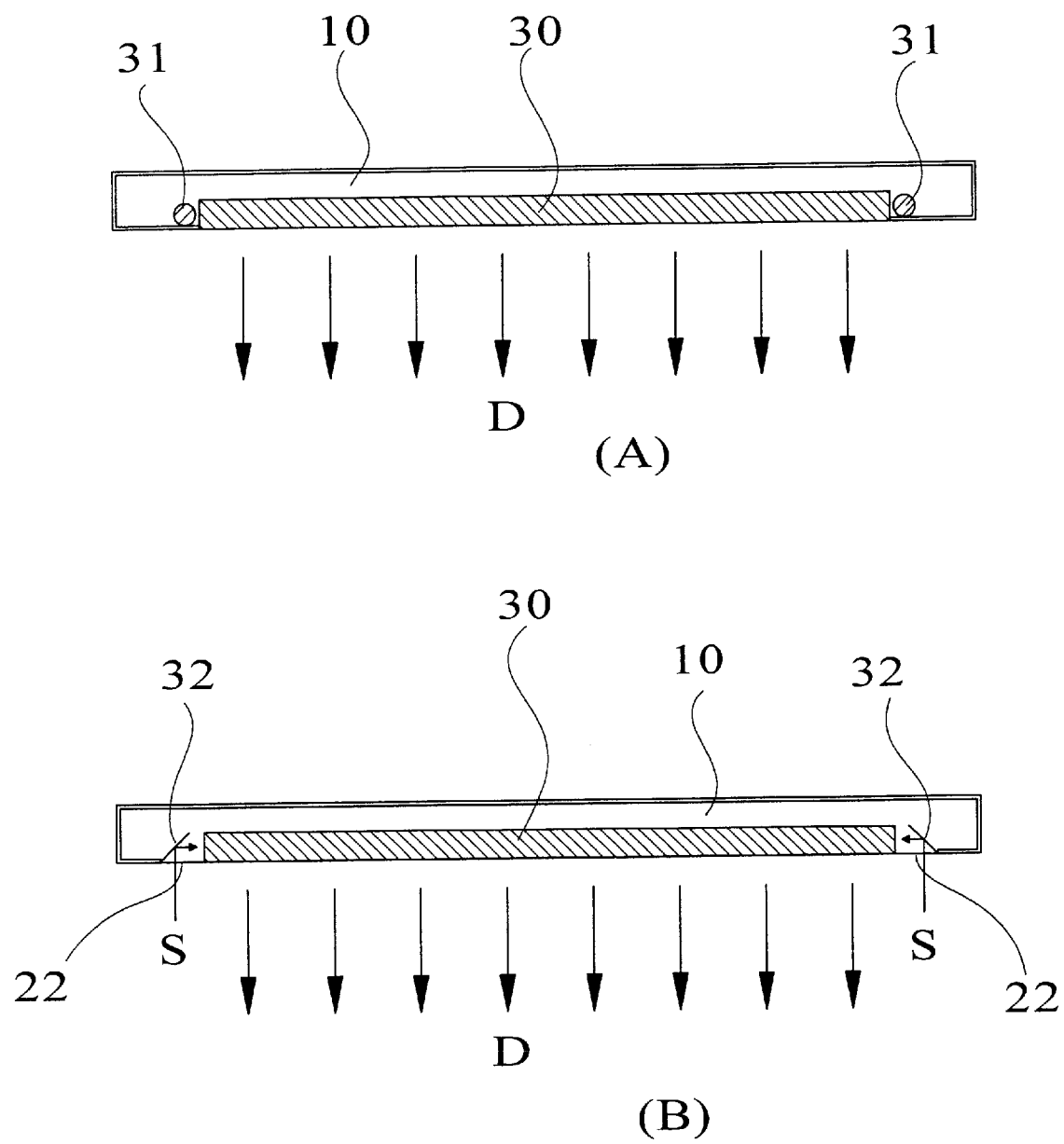
FIG. 4 is a sectional view cut along the 4-to-4 dashed line in FIG. 2, where FIG. 4(A) includes light source devices, and FIG. 4(B) includes reflecting plates.

Next, with reference to FIG. 4, an embodiment of the present invention illustrates how the light is provided to the light conductive plate 30. As shown in FIG. 4(A), the light lid 1 further comprises light source devices 31 and 31, which are fixed on both ends of the light conductive plate 30. The light source devices 31 and 31 are connected to the scanner through conducting lines (not shown in the FIG.), using the prior technique, to receive the power. When the light source devices 31 and 31 is powered on, the light illuminates into the light conductive plate 30. Then, the light is conducted by light conductive plate 30 to illuminate evenly upwards and downwards so that the light source for scanning the transparent originals is provided. In addition, a reflecting device (not shown in the FIGS.) can also be positioned outside the light source devices 31 and 31 to increase the brightness of the light source devices 31 and 31 to illuminate into the light conductive plate 30.

As shown in FIG. 4(B), the light lid 1 further comprises two second reflecting devices 32 and 32, which are fixed on both ends of the light conductive plate 30. Besides, corresponding to the reflecting devices 32 and 32, the second openings 22 and 22 are formed on the bottom of the housing 10. Therefore, the light S provided upwardly by the scanner itself can illuminate on the light conductive plate 30 through the openings 22 and the reflecting devices 32. And then the light conductive plate 30 can provide smooth light to the scanner and the opening 20. In this embodiment, the light lid 1 can use the light provided by the scanner itself, so there is no need to place extra light source devices in the light lid.

The light lid with a previewing window of the present invention uses an opening formed on the housing and uses the light conductive plate, which is positioned on the housing, to conduct the light upwards to the opening. Thus, the user can put the negatives above the opening and clearly preview the image of the negatives through the light. Furthermore, reflecting plates can also be positioned on both sides of the light lid, and the second openings are formed on the bottom of the housing, down on the reflecting plates. By doing this, the light that is provided by the scanner itself can reach the light conductive plate through the second openings and the reflecting plates, so there is no need to place other light source devices on the light lid.

In the foregoing, an embodiment is described to illustrate the light lid with a previewing window of the present invention. However, said embodiment is only an example, which means it doesn't limit the present invention. People working in this field can make various modifications and changes according to their needs.

What is claimed is:

1. A light lid with a previewing window for using with a flat bed scanner, comprising:
   a housing, which has the first opening; and
   a light conductive plate, which is positioned under said housing, conducting light upwards and downwards evenly so that the light passes through said opening and provides the light to the scanner.

2. The light lid with a previewing window as claimed in claim 1, further comprising a first reflecting plate positioned under said light conductive plate, corresponding to the location of said first opening to reflect light toward said first opening for increasing the brightness of the light.

3. The light lid with a previewing window as claimed in claim 1, wherein said light conductive plate comprises light source devices on both ends to provide the light for said light lid.

4. The light lid with a previewing window as claimed in claim 3, further comprising second reflecting plates positioned on both sides of said housing corresponding to said second openings to reflect external light into said light conductive plate for providing the light for said light lid.

5. The light lid with a previewing window as claimed in claim 1, wherein said housing includes second openings on the bottom of the both sides.

* * * * *